US006865286B2

(12) United States Patent
Florent et al.

(10) Patent No.: US 6,865,286 B2
(45) Date of Patent: Mar. 8, 2005

(54) IMAGE PROCESSING METHOD, SYSTEM AND EXAMINATION APPARATUS FOR A TOTAL EXTRACTION OF A THREADLIKE STRUCTURE IN A DIGITAL IMAGE

(75) Inventors: Raoul Florent, Valenton (FR); Lucile Goubet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 655 days.

(21) Appl. No.: 09/860,355

(22) Filed: May 18, 2001

(65) Prior Publication Data

US 2001/0055413 A1 Dec. 27, 2001

(30) Foreign Application Priority Data

May 23, 2000 (EP) .......................................... 00401429

(51) Int. Cl.[7] .................................................. G06K 9/00
(52) U.S. Cl. .................................................... 382/128
(58) Field of Search ............................... 382/128, 129, 382/131, 132, 190; 378/4, 21, 42, 62; 345/694; 250/559.05

(56) References Cited

U.S. PATENT DOCUMENTS 4,910,789 A    3/1990  Eichel ......................... 388/811
5,274,551 A  * 12/1993  Corby, Jr. .................... 600/433
5,289,373 A    2/1994  Zarge et al. .................. 600/434

OTHER PUBLICATIONS

Deschamps and L. Cohen: "Path extraction in 3D medical images for virtual endoscopy" ISRACAS'2000, Third Israeli Symposium On Computer–Aided Surgery, Medical Robotics, And Medical Imaging, Online! May 18, 2000, pp. 1–11.

* cited by examiner

*Primary Examiner*—Andrew W. Johns
*Assistant Examiner*—Shervin Nakhjavan

(57) ABSTRACT

An image processing method for extracting a thread-like structure (GW) represented on the background in a digital noisy original image ($IM_1$, $IM_0$), comprising steps of acquisition (1) of the original image data of one End-Point ($P_0$, $Q_0$) of the threadlike structure and comprising steps of iterative Front Propagation stage (4) starting from the unique End-Point ($P_0$, $Q_0$) and supplying an End-Front ($F_1$, $F_2$) yielding End-Front Points (41); constructing a set of Candidate Paths between the unique End-Point ($P_0$, $Q_0$) and said End-Front Points and selecting (42) one Best Candidate Path for representing the threadlike structure. Application: Medical Imaging; X-ray apparatus with image processing means and display means.

13 Claims, 4 Drawing Sheets

100# IMAGE PROCESSING METHOD, SYSTEM AND EXAMINATION APPARATUS FOR A TOTAL EXTRACTION OF A THREADLIKE STRUCTURE IN A DIGITAL IMAGE

The invention relates to an image processing method for extracting completely a threadlike structure represented on a background in a noisy digital image. In particular, the invention concerns an image processing method for extracting the pixels representing a guide-wire in an X-ray fluoroscopy medical image. The invention also relates to a system for carrying out the method and to an examination apparatus having means for image processing and display.

The invention is applied to the industry of medical imaging.

An image processing method for extracting a catheter guide-wire is already disclosed in a U.S. Pat. No. 5,289,373 (Zarge et alii). This document relates to a method and an apparatus for real-time tracking of a catheter guide-wire in fluoroscopy images during interventional radiological procedures. This method comprises a first step of pixel-wise extraction for determining whether or not each pixel should be labeled as a possible guide-wire point and forming an image called binary peak image; a second step of chain model construction followed by an identification of a guide-wire model as the most promising path among previously determined chains; a third step of superimposition of the guide-wire model onto the live fluoroscopic images. The first step is an iconic process that deeply exploits the outputs of several first and second order linear operators. The second step is non-iconic. It relies to morphological operations and to chain and tree oriented methods.

The present invention has for an object to provide a method which can be carried out automatically in real time, with a substantial gain of speed with respect to the method known of the state of the art, together with higher sensitivity and selectivity, thus while considering using processing means having speed of the kind which is presently used in the state of the art.

An image processing method, which solves this problem, is claimed in Claim 1. A system for carrying out the method is claimed in Claim 11. An X-ray apparatus with means for carrying out the above processing method is further claimed in Claim 12.

An advantage of the processing method lies in the fact that only one starting end-point is needed for extracting the threadlike structure.

An other advantage is that this method is capable of finding complementary parts of the threadlike structure, which have not yet been detected using preliminary steps of detection by other methods, in order to complete the detection. A particular advantage is that this method permits of completing the extraction of the threadlike structure using the only prior knowledge of one starting end-point. An other particular advantage is that this method permits of completely extracting the whole threadlike structure even in the case when no other points than one only starting end-point is given.

The invention is described hereafter in detail in reference to the diagrammatic figures, wherein.

The invention relates to an image processing method for extracting a threadlike structure represented on a background in a noisy digital image. In an example, the threadlike structure is a guide-wire represented on the background of a medical fluoroscopy arteriogram image, which is a digital image formed with a low level of X-rays. It results that this fluoroscopy digital image is noisy. In this example, the method has for an object to extract the guide-wire pixels in order to improve its visibility in the arteriogram image. In cardiology, sequences of X-ray arteriogram images are used to visualize in real time medical procedures of introducing a catheter in a vessel. Such medical procedures deeply rely on the correct visibility of the guide-wire, which is a metallic wire introduced in the vessel for guiding the catheter. Improving the visibility of the guide-wire permits of avoiding damaging the vessel while moving the catheter in the vessel. In an other example, the threadlike structure is a thin vessel in an arteriogram image.

Figure 1:
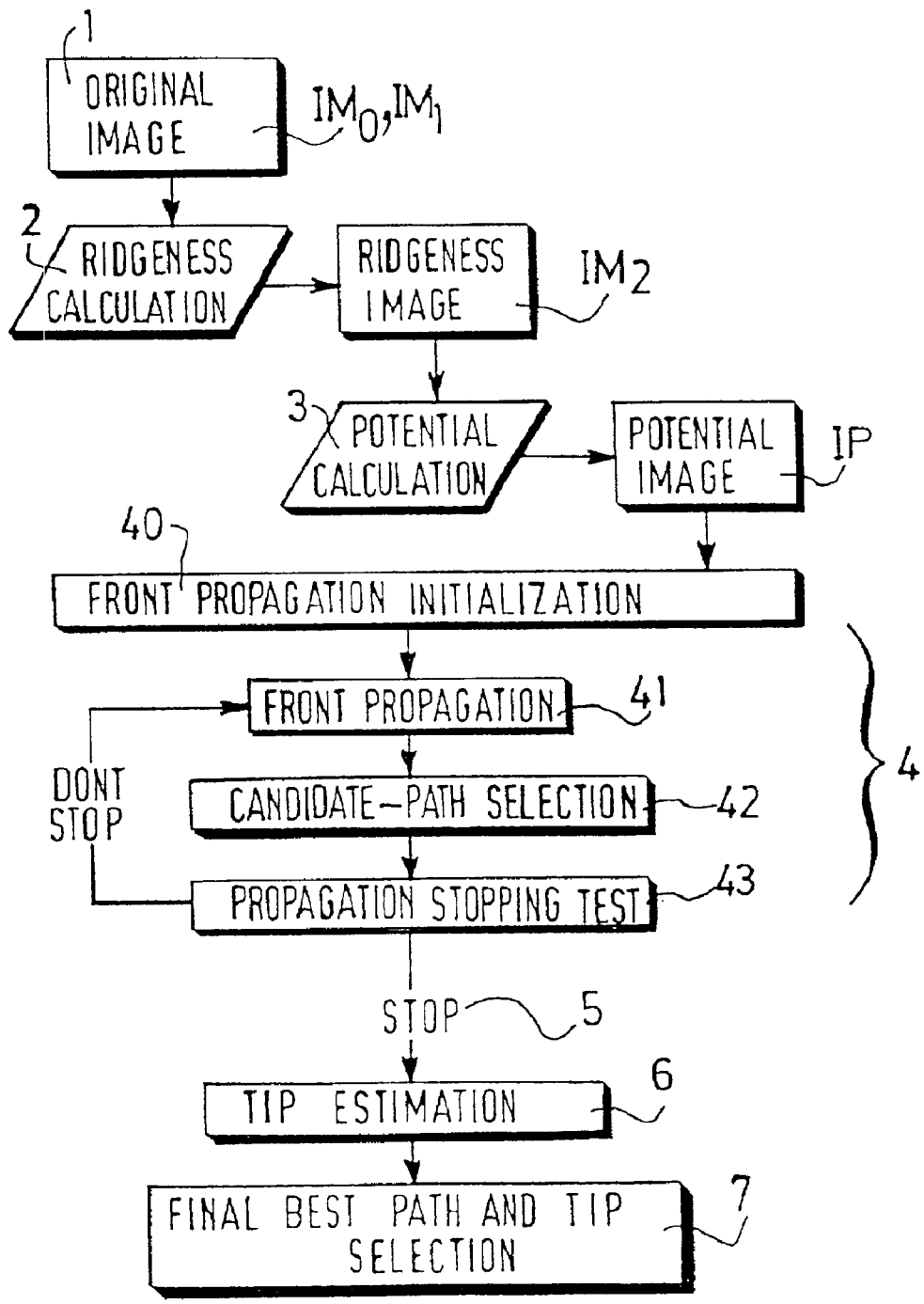
FIG. 1 is a functional block diagram of the steps of the method.

FIG. 1 shows diagrammatically the steps of a processing method for extracting a threadlike structure represented on the background of a noisy digital image called original image $IM_1$ or $IM_0$. The following process is completely described by its functioning on only one image. However, the processing method is appropriate to be carried out in real time, that is to say at a frame rate of about 16 to 25 images per second, if the processing means used for its implementation is appropriate.

Stage 1: Image acquisition

Figure 2A:
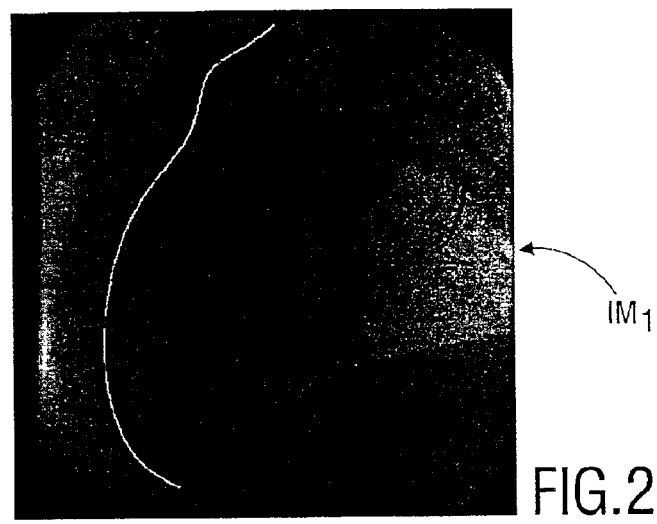
FIG. 2A is an original photo image representing a partially detected guide-wire on a background.
Figure 2B:
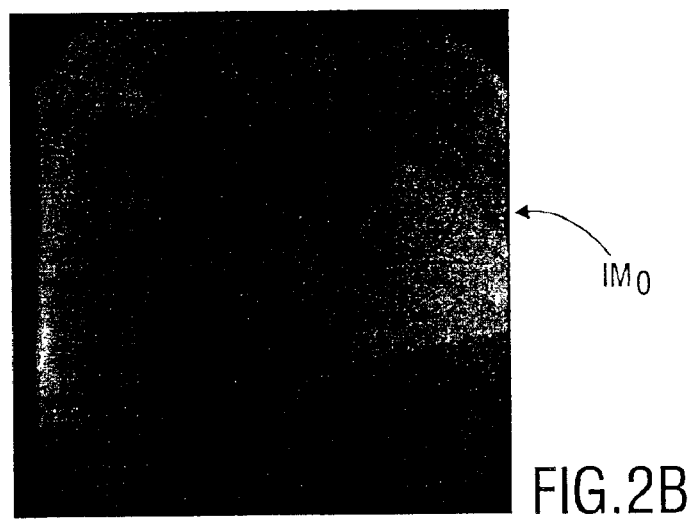
FIG. 2B is a photo image representing a fully detected guide-wire on a background resulting from the method.

FIG. 2A shows a digital photo called original image $IM_1$, representing a threadlike structure GW in dark on a noisy slightly less dark background and a part of this threadlike structure in white that has already been detected by preliminary steps of a known method. The already detected part of the threadlike structure is called Original String OS. FIG. 2B shows a digital photo of an other original image called $IM_0$, representing a threadlike structure in dark on a noisy slightly less dark background that has not at all been detected and that is called NT.

Figure 3A:
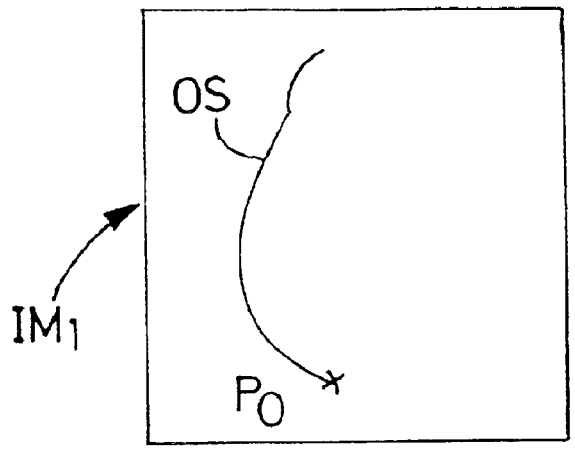
FIG. 3A, FIG. 3B and FIG. 3C are schematic representations of the images of FIG. 2A, FIG. 2B and FIG. 2C.
Figure 3B:
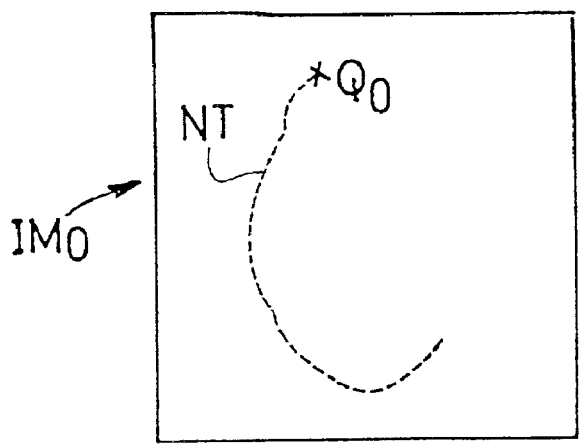

FIG. 3A is schematic representation of the original image $IM_1$, and FIG. 3B, is a schematic representation of the original image $IM_0$, in which the threadlike structure NT is represented by a broken line. Referring to FIG. 1A, to FIG. 3A, and to FIG. 3B, in a first stage of the method, the image data of said original image are acquired. These data contain intensity information and co-ordinate information associated to the image pixels and particularly those of the Original String in the case when it has already been detected. The data also contain information relating to an End-Point $P_0$ of the Original String OS or to an End-Point $Q_0$ of the threadlike structure NT.

Figure 2C:
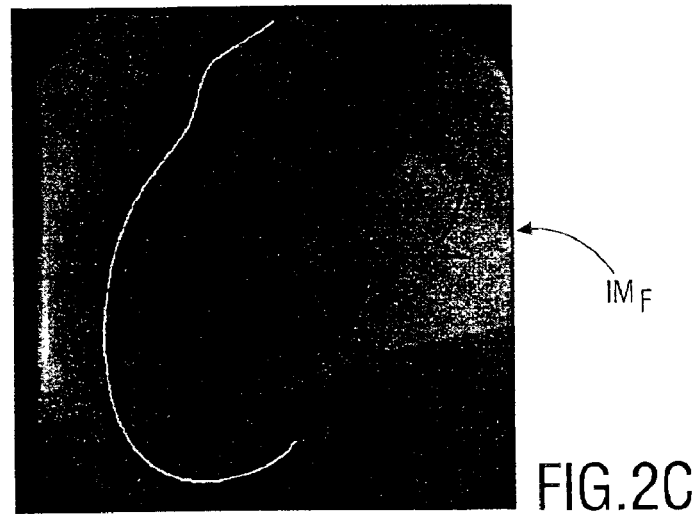
FIG. 2C is a photo image of the fully detected guide-wire.
Figure 3C:
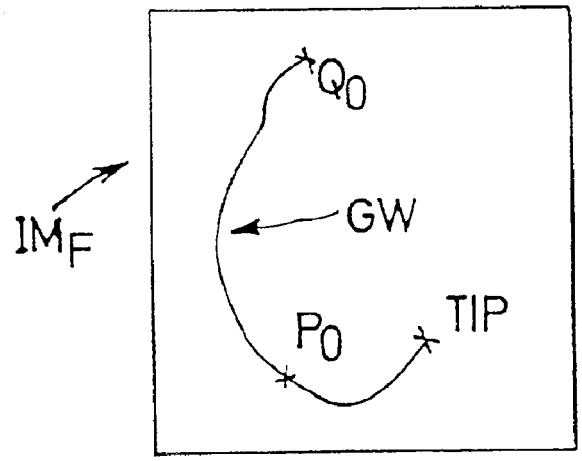

It is an object of the invention to extract the whole threadlike structure as shown in FIG. 2C and in FIG. 3C, which is a schematic representation of FIG. 2C. This extraction is performed either by completing the Original String OS of FIG. 2A and FIG. 3A or by extracting a new whole threadlike structure from the prior knowledge of only one End-Point $Q_0$ of said New Threadlike Structure NT as shown in FIG. 2B and represented schematically in FIG. 3B. In the case when an Original String OS has already been extracted, it may happen that, for different reasons mostly based on lack of contrast in the Original Image, some parts of the threadlike structure are still missing. It is an object of the invention to correct this defect by a new passage of specific processing steps according to the present method. In an other case when the threadlike structure NT had not yet been extracted at all, the method is able to perform this extraction from the beginning with a prior knowledge of the point $Q_0$.

Stage 2: Ridgeness calculation

The image $IM_1$ or $IM_0$ comprises different structures such as ridges, or instead troughs, and textures. A positive image is considered as a 3-D picture, having two dimensions for the co-ordinates of pixels and a third dimension for the intensity signals associated to said pixels. A ridge is a crest-like structure formed by adjacent pixels having intensity signals that are maximum in a neighborhood, said pixels having specific dispositions the ones with respect to the others resulting in specific gradient values with respect to orientations. A ridge pixel shows a low intensity gradient in a first determined direction in its neighborhood, and shows an intensity gradient that is maximum in a direction perpendicular to said first direction. The more a given structure is formed of pixels verifying this gradient property, the more the ridgeness measure of the structure is high. Instead of ridges, troughs can be considered in a negative original image $IM_1$ or $IM_0$ for instance obtained by x-ray imaging. In an x-ray negative image, a guide-wire is a dark structure on a lighter background. In this case, the calculations for extracting the guide-wire have for an object to extract trough pixels, which can be determined by measures similar to ridgeness calculations. In ridgeness calculations applied to troughs determination, the estimation of specific intensity gradients that is required for characterizing ridges is still valuable for characterizing troughs. So, in the description of the present method, these calculations are called "ridgeness" calculations, whether they are applied to ridges or troughs in the original image $IM_1$ or $IM_0$.

Referring to FIG. 1, the method comprises a stage 2 of "ridgeness" calculation applied to the original image $IM_1$ or $IM_0$. This "ridgeness" calculation is performed by applying on the pixels of the image of FIG. 1A, filters known as ridge-filters, which determine the pixels of the ridge structures, or of the troughs. Based on this ridgeness calculation, each pixel of the original image $IM_1$ or $IM_0$ is further associated to a ridgeness data. The resulting image is called ridgeness image IM2.

Stage 3: Potential Calculation

Referring to FIG. 1, in a stage 3 of the method, an Image of Potentials called IP is calculated from the ridgeness image. In the Image of Potentials: The potentials of the pixels belonging to ridge or trough structures, which have been found by ridgeness calculation, are attributed first potential values, lower than a predetermined potential value, favorable to a further operation of Front Propagation, and the pixels located outside the ridge or the trough structures are attributed potentials whose values are function of their ridgeness data values. The more important the ridgeness, the lower the attributed potentials.

Stage 4: Candidate Path Estimation

Referring to FIG. 1, the method specifically comprises a Stage 4 called "Candidate Path Estimation", which is applied to the image of Potentials IP where the pixels data (co-ordinates and intensities) are associated to the ridgeness data. The Candidate Path Estimation has for an object to provide several Candidate Paths along the pixels having lower potential values in said image of Potentials.

In a preliminary step 40 of the Candidate Path Estimation, an initialization of a Front Propagation operation is performed around the predetermined Starting End-Point $P_0$ or $Q_0$.

In a first step 41 of the Candidate Path Estimation 4, a Front Propagation operation is performed from the Starting Point $P_0$ or $Q_0$, in order to supply Candidate Paths using a Front Propagation technique, which forms paths only with pixels that have low Potential values.

As an example, a front propagation technique is disclosed in a publication entitled "A fast marching level set method for monotonically advancing fronts" by J. A. SETHIAN in Proc. Nat. Acad. Sci., USA, Vol. 93, pp. 1591–1595, February 1996, Applied Mathematics. According to said reference, a front, formed in a 2-D grid of potential values, is propagated using a "Fast Marching Technique" with a determination of the front points. The front is a solution of a so-called Eikonal Equation. The Fast Marching Technique introduces order in the selection of the grid points and sweeps the front ahead in one pass on the 2-D image. The Fast Marching Technique comprises marching the Front outwards by freezing already visited points denoted Alive, coming from a set of points referred to as Narrow Band, and by bringing new ones denoted Far Away into said Narrow Band. The Narrow Band grid points are always up-dated as those having minimal potential values in a neighboring structure denoted Min-Heap and the potential of the neighbors are further re-adjusted. Said Fast Marching technique provides one path of minimal cost joining the start point to respectively each point of the front, said front propagating until the end point is reached. Then, the minimal path is provided by back-propagating from the end point to the start point by the steepest gradient descent in the convex surface. The numerous paths constructed by propagating the front forwards and joining the start point to the different points of the front for forming the convex surface are no more taken into account. Even the path joining the start point to the end point, in the operation of forwarding the front, is not the steepest gradient descent in the back-propagation operation. It is interesting to note that the points of a path constructed in the operation of marching the front forwards are points which have the smallest possible potentials. Starting at the start point, and going forwards from one point to the next point must be at the "minimal cost". So, such a path is a path of "minimal Action", i. e. a path on which the "Sum" or the "Integral" of potentials calculated over point potentials is the smallest though strictly continuously growing as a function of the number of points present on said path between the start point and the current point on the front. This Front Propagation Technique thus needs two End-Points between which it propagates the Front onwards and backwards.

According to the present method, the Front Propagation is performed from the Starting Point $P_0$ or $Q_0$, and no specific previously determined final point is given to end the Front Propagation. So, the problem of ending the Front Propagation is solved by the following conditions to perform said Stage 4, which are:

In step 41, a given number n of iterations is predetermined for the Propagation. This number may be predetermined by the user in a range of values and the Front Propagation is then performed during the given number of n iterations, which produces a End-Front called $F_1$ at the end of the n iterations.

In step 42, the points of the End-Front called $F_1$ are considered together with the Starting Point $P_0$ or $Q_0$, and the Paths connecting the points of the End-Front $F_1$ to the Starting Point $P_0$ or $Q_0$ are issued to further processing. These Paths are called First Set of Candidate Paths.

In step 42, a selection is further performed among the First Set of Candidate Paths in order to determine one Best Candidate Path. This selection is performed using a criterion based on ridgeness: The Best Candidate Path is the one that have the highest ridgeness or the highest cumulated ridgeness. The cumulated ridgeness is the sum of the ridgeness of the different points forming the path. At the end of the n iterations, among all the paths of the First Set of Candidate Paths formed between the Starting Point $P_0$ or $Q_0$ and the Front $F_1$, the selection step 42 provides one Best Candidate Path. This step 42 may provide, on the one hand, a Best Candidate Path that describes at least a part of the threadlike structure, which part had not yet been already described, and which part is an extension of the Original String OS. This step 42 may provide, on the other hand, a Best Candidate Path that describes at least a part of the threadlike structure, which part had not yet been already described, and which is a part of a new threadlike structure NT.

In step 43, a Stopping Test determines whether the Best Candidate Path, which has been just found is the required threadlike structure or not. In step 43, Stopping Conditions are posed. These Stopping Conditions are based either: on the ridgeness, the contrast and the shape of the selected Best Candidate Path, or on a given number of iterations. If those Stopping Conditions of step 43 are fulfilled, then the answer to the Stopping Test is: STOP. If these Stopping Conditions to the Stopping Test are not fulfilled, then the answer is: DON'T STOP and in that case, the method stage 4 is performed again from step 41 to step 43. This provides a new set of candidate paths called Second Set of Candidate Paths among which a Second Best Candidate Path is selected. Several Best Candidate Paths may be determined if the result of the Stopping Test is "DON'T STOP" several times before the answer "STOP" is reached. The answer- "STOP" to the Stopping Test expresses that the found Best Candidate Paths shows a satisfying contrast, an adequate shape, a high ridgeness.

Stage 5: STOP

When the answer "STOP" has been reached, then the Iteration Steps are stopped. There may be one or several Best Candidate Paths to examine.

Stage 6: Tip Estimation

The Tips, which are the final End-Points, at the other extremity of the examined Best Candidate Paths with respect to the Starting End-Point $P_0$ or $Q_0$, are searched according to criterions based on:

contrast comparisons in several parts of a considered Best Candidate Path, and ridgeness comparisons along said Best Candidate Path.

A Tip is found for a considered Best Candidate Path when the point selected as Tip has the best contrast and the highest ridgeness in its neighborhood. Tips are searched for all the Best Candidate Paths as illustrated by FIG. 3C.

Stage 7: Final Best Path Estimation

A Final Best Path is selected among the several Best Candidate Paths using a criterion based on the mean contrast and final shape of the Best Candidate Paths.

System and Apparatus

Figure 4A:
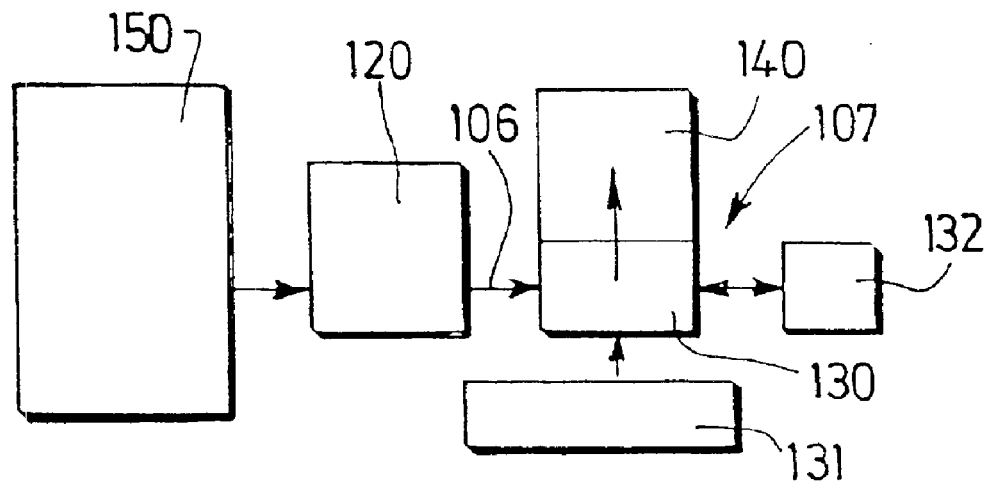
FIG. 4A, 4B illustrate an image processing system and an examination apparatus with display means, for carrying out the method.
Figure 4B:
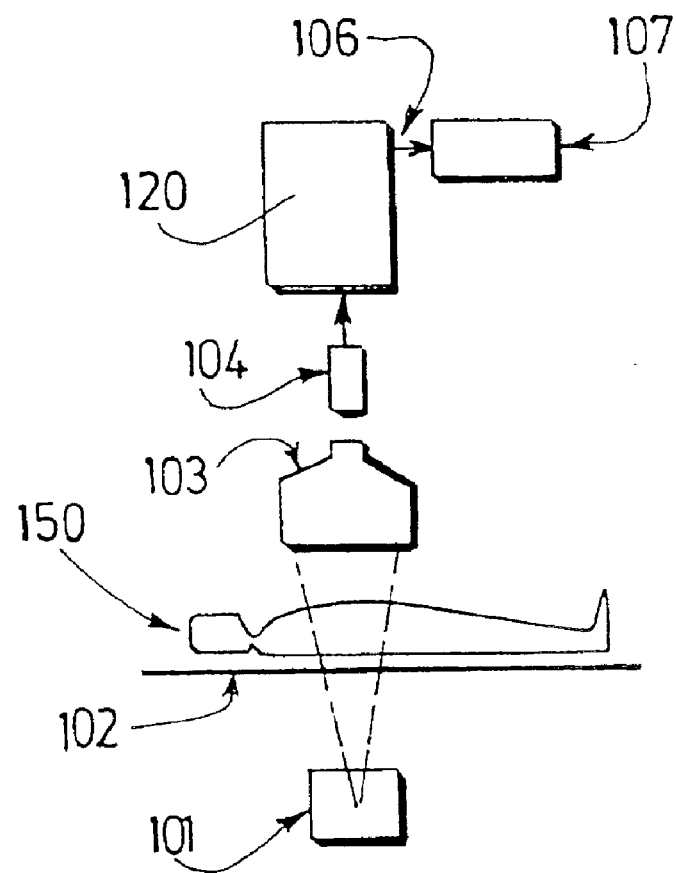

Referring to FIG. 4A, 4B, an X-ray medical examination apparatus 150 comprises means for acquiring digital image data of a medical image, and a digital processing system 120 for processing these data according to the processing method described above. The X-ray apparatus comprises an X-ray source 101, a table 102 for receiving a patient to be examined, an optical system 103, 104 for providing image data to the processing system 120 which has at least one output 106 to provide image data to display and/or storage means 107. The display and storage means may respectively be the screen 140 and the memory of a workstation 130. The display means may comprise a screen to display the medical original images and the processed medical images, in such a way that the displayed processed images may help the practitioner during a medical act. Said storing means may be alternately external storing means.

The image processing system 120 may be: a suitably programmed computer of the workstation 130, or a special purpose processor having circuit means such as LUTs, Memories, Filters, Logic Operators, that are arranged to perform the functions of the method steps according to the invention. The workstation 130 may also comprise a keyboard 131 and a mouse 132.

What is claimed is:

1. An image processing method for extracting a threadlike structure (GW) represented on the background in a digital noisy original image ($IM_1$, IM0), comprising steps of;

acquiring original image data including data of one End-Point ($P_0$, $Q_0$) of the thread-like structure;

implementing an iterative Front Propagation operation utilizing at least one End-Point ($P_0$, $Q_0$) to generate an End-Front ($F_1$, $F_2$) yielding End-Front Points;

constructing a set of Candidate Paths between the unique End-Point ($P_0$, $Q_0$) and said End-Front Points; and selecting one Best Candidate Path of the set of constructed Candidate Paths for representing the threadlike structure.

2. An image processing method as claimed in claim 1, wherein the selecting step (42) is based on optional selection conditions of ridgeness, contrast, and shape of the Candidate Paths.

3. An image processing method as set forth in claim 1, wherein the step of selecting includes conducting a Stopping Test, whereby said step of implementing is carried out until stopping conditions are met which verify the Best Candidate Path.

4. An image processing method as claimed in claim 3, wherein a number (n) of iterations is predetermined for the step of implementing an iterative Front Propagation operation.

5. An image processing method as claimed in claim 4, wherein the Stopping Test takes the number of iterations (n) and the ridgeness, contrast, and shape of the Best Candidate Path as Stopping Conditions.

6. An image processing method as set forth in claim 3, wherein if the stopping conditions are not met, the step of implementing an iterative Front Propagation operation is repeated to generate at least one Best Candidate Paths until the Stopping Conditions are met to yield at least one Best Candidate Paths.

7. An image processing method as claimed in claim 6, wherein a Final Best Path is selected among the several Best Candidate Paths based on a criterion of best mean contrast and best shape for representing the threadlike structure.

8. An image processing method as set forth in claim 6, wherein a tip estimation is performed for each Best Candidate Path in order to determine an end point of said Best Candidate Path, with respect to the Starting Point, said tip estimation based on contrast and ridgeness comparisons along said Best Candidate Path so that the Tip found for said considered Best Candidate Path is the point that has the best contrast and the highest ridgeness in its neighborhood.

9. An image processing method as set forth in claim 1, further including, prior to the step of implementing an iterative Front Propagation operation, a step of calculating a ridgeness value, and forming a ridgeness data image (IM2), wherein ridge pixels within the ridgeness data image show an intensity gradient that is maximum in a first determined direction in its neighborhood, and a lower intensity gradient in a direction perpendicular to said first direction, such that the greater the number of pixels verifying the gradient property that are used to form the image structure, the greater the ridgeness measure of the image structure.

10. An image processing method as claimed in claim 9, further including, prior to the step of implementing an iterative Front Propagation operation, a step of forming a Potential Image (IP) from the ridgeness data image is carried out, where the potentials of the pixels belonging to the ridge structures are set to first values, lower than a given predetermined value, the potentials of the other pixels are set to second values, higher than said predetermined value, as a function of their ridgeness data values, and the step of implementing an iterative Front Propagation operation is performed on the lower potentials in the Potential Image (IP).

11. A system comprising a suitably programmed computer or a special purpose processor having circuit means, which are arranged to process image data according to the method as claimed in claim 1.

12. An apparatus having means for acquiring medical digital image data and having a system having access to said medical digital image data for carrying out a processing method according to claim 1, and including display means for displaying the medical digital images and the processed medical digital images.

13. A computer program product embodied in a computer readable media comprising a set of instructions for carrying out a method as set forth in claim 1.

* * * * *